United States Patent [19]

Owen et al.

[11] 3,993,584

[45] *Nov. 23, 1976

[54] AGGLOMERATE CONTAINING FIBROUS POLYTETRAFLUOROETHYLENE

[75] Inventors: James E. Owen, Shaker Heights; J. William Vogt, South Russell, both of Ohio

[73] Assignee: The Harshaw Chemical Company, Cleveland, Ohio

[ * ] Notice: The portion of the term of this patent subsequent to Sept. 24, 1991, has been disclaimed.

[22] Filed: Sept. 20, 1974

[21] Appl. No.: 507,920

Related U.S. Application Data

[63] Continuation-in-part of Ser. No. 316,872, Dec. 20, 1972, Pat. No. 3,838,092.

[52] U.S. Cl. .......................... 252/383; 106/308 M; 252/384; 260/42.27
[51] Int. Cl.² .......................................... C09K 3/22
[58] Field of Search .................. 260/42.27, 900; 252/383, 384; 106/308 M

[56] References Cited
UNITED STATES PATENTS

| 3,455,749 | 7/1969 | Gow | 149/3 |
| 3,466,204 | 9/1969 | Gow | 149/3 |
| 3,838,092 | 9/1974 | Vogt et al. | 260/33.6 F |

FOREIGN PATENTS OR APPLICATIONS

| 891,537 | 1962 | United Kingdom |
| 930,093 | 1963 | United Kingdom |

Primary Examiner—James H. Derrington
Attorney, Agent, or Firm—Alfred D. Lobo

[57] ABSTRACT

A coherent, weak agglomerated dustless solid particulate mass is formed from a mixture of discrete particles in the size range from less than about 1 micron to about 2,000 microns, and fibrillatable polytetrafluoroethylene (hereinafter referred to as PTFE) in an amount from about 0.02, but less than 1 percent and preferably less than 0.75 percent by weight based on total solids, by working the mixture in a dry or relatively dry state with a working action in an unconfined zone at a temperature in excess of 20° C., but below the sintering temperature of PTFE or a temperature deleterious to said particles, whichever is lower, without changing the primary particle size range of the material.

4 Claims, No Drawings

AGGLOMERATE CONTAINING FIBROUS POLYTETRAFLUOROETHYLENE

CROSS-REFERENCE TO RELATED APPLICATION

This is a continuation-in-part application of our copending application Ser. No. 316,872 filed Dec. 20, 1972, now U.S. Pat. No. 3,838,092.

BACKGROUND OF THE INVENTION

It is common practice, and has been for many years, to pelletize solid, particulate dusty materials for storing, handling and transporting the materials. Dusty materials, referred to herein, include solid particulate matter which is reduced to minute portions as in a fine powder, and normally dusty materials refer to those powders which generate dust when they are transferred from one container to another. Normally dusty materials are exemplified by finely ground silica less than 325 Tyler mesh in size, finely ground pigments, flour, talc, clay, particulate electrodeposited metals and metal oxides, carbon black, various forms of activated carbon, and the like. In general, all finely divided powders with a significant superfines content, having particles less than about 37 microns in size, which exhibit a notorious proclivity to dust are usually referred to in industry as normally dusty materials or normally high-dusting materials. It is to all dusty materials that the article of manufacture of this invention is directed.

Pelletizing of dusty material is commonly effected from a fluid paste or a slurry incorporating a binder, in what is referred to as a wet process. Typically, a paste of a liquid binder and particulate material is extruded through a die to yield an extrudate, or strands of a thick paste are formed on a grooved drum. The extrudate or strands are thereafter chopped to provide dense, damp pellets of predetermined size. The damp pellets are subsequently dried into relatively small shapes, not necessarily regular, from about ⅛ inch to about ½ inch in diameter. The dried pellets, because of the cohesive effect of the binder, are relatively strong and can withstand considerable pressure. For example, dense, dried pellets at the bottom of a 55-gallon drum will normally retain their shapes with only minor attrition. When dense pellets break, due to mechanical shock, they tend to shatter.

The agglomerate of the instant invention may be formed in the dry state, without the benefit of a liquid binder. Where, for convenience in processing, a liquid dispersing medium is used to effect a homogenous dispersion of fibrillatable PTFE in a normally dusty material prior to separating the liquid therefrom, and a small amount of residual liquid is left in the mixture, the mixture may nevertheless be worked effectively; the presence of residual liquid is unnecessary during the working of the mixture to form the novel agglomerate.

Certain dusty materials, such as carbon black, lend themselves to agglomeration not only by a wet process referred to hereinabove, but also by a dry process in which, despite lack of a binder, a pellet is formed in which particle-to-particle adhesion is obtained by virtue of the relatively high bulk density of the pellet, usualy from 1.5 to 5 times numerically greater than that of the dusty material in its normal quiescent state. Other materials, particularly powder metals and organic powders, are commonly tabletted in the dry state, often with a solid binder. A typical tablet, formed in the dry state, is an aspirin tablet. Pellets formed by the dry process have the obvious advantage of being free from contaminating binders and at the same time, because of their greater density, provide a shrunk volume which reduces shipping charges. PTFE resin is a known lubricant for tabletting a variety of particulate materials.

Processes for the formation of densified green articles with particle-to-particle adhesion, which articles are subsequently sintered or heat-treated, are unrelated to the process of this invention or to the novel agglomerate formed thereby. The novel agglomerate is not sintered and no attempt is made to invest it with that degree of structural integrity characteristic of pellets adapted to withstand handling and to maintain their shape during transportation by virtue of their density. Prior art agglomerates have been described as fragile and friable, though dense and rugged. The criterion of friability was generally set by the ability of the pellet to be incorporated into a mixture in heavy equipment, such as a Banbury mill, and the self-evident need for ruggedness was determined by the desirability of presenting the pellet to the mill without permitting it to disintegrate. In contrast, the need to which the instant process is directed is primarily to provide a dustless agglomerate substantially free of particle-to-particle adhesion, with essentially no structural integrity and which is at the same time both friable and pliable at ambient temperature and pressure conditions, as will be described more fully hereinfter. It will be recognized that the formation of the week agglomerate of ths invention has little in common with the formation of an agglomerate from a pasty, sticky or gummy resinous mass, of from a solid particulate mixture having a relatively large amount, greater than 1 percent by weight, of PTFE.

In the sense that the finely divided normally dusty powder is held together in an agglomerate without particle-to-particle adhesion, the binder in the instant invention is provided by a matrix of microscopic and submicroscopic fibers of fibrillatable fine powder PTFE resin which is a homopolymer of tetrafluoroethylene in the form of spheroidal porous aggregates with an average diameter of about 450 microns. Commonly available granular molding powder of PTFE resin is not fibrillatable and is ineffective to form the desired matrix.

U.S. Pat. No. 3,005,795 discloses synthetic polymeric resin mixtures of normally rigid thermoplastic polymers which contain small amounts of fine, fibrous particles of fibrillatable polytetrafluoroethylene resin incorporated by milling the molten resin with from 0.05 to 20 percent by weight of PTFE. Polymers modified with PTFE exhibit higher melt elasticity than the unmodified polymers and are more suitable in forming operations, such as wire coating, extrusion and thermoforming.

U.S. Pat. No. 3,326,731 discloses a plastic explosive composition which utilizes from 5 to 25 percent by weight of PTFE resin. The plastic explosive composition formed is pliable, surprisingly strong and can be inelastically extended 50 percent or more.

U.S. Pat. Nos. 3,455,749 and 3,466,204 discloses a plastic explosive composition and a process for making it in which PTFE in the range from 1–5 percent by weight is usually sufficient to give compositions which can be formed in coherent plastic state under very light compression and which have a consistency somewhat resembling the confection known as marshmellow.

Thses mucilaginous, soft, creamy and pliable compositions are not friable.

British Pat. No. 891,537 discloses the use of PTFE as a binding agent, by itself or in combination with other binding agents. The binding agents may be added at any convenient stage, as for example, to an aqueous slurry of a particulate powder to form an aqueous suspension from which most of the water is removed to form a paste. The paste so obtained may be shaped into pellets, granules and other agglomerated forms in any manner known in the art, for example, by extrusion through a die, or by forming on a grooved drum. The proportion of binding agent to be employed may be in the range from 0.05 to 12 percent of the weight of the powdered organic chemical substance which is pelleted.

The physical properties of known compositions with PTFE contents in the range 1–5 percent by weight are surprisingly different from the properties of an agglomerate of normally dusty material which contains less than 1 percent by weight PTFE, and preferably from about 0.02 to about 0.75 percent by weight, based on total solids. For example, a relatively large agglomerate is weak, pliable and easily deformed under light pressure between a person's fingers; it has essentially no stability of shape where a multiplicity of agglomerates are stored in a large receptacle, such as a drum, bin or hopper, or are transmitted in a shipping container.

Again, known compositions containing in excess of 5 precent by weight PTFE have physical properties, for example, surprising strength and inelastic extensibility greater than 50 percent, which are quite unlike the combination of weak, friable and characteristically tearable properties of the agglomerate of this invention. Significantly, this combination of properties, heretofore deemed undesirable in a transportable agglomerate, imbue the agglomerate with an essentially total freedom from dusting and exceptional dispersibility in other materials.

SUMMARY OF THE INVENTION

It has been discovered that a small amount of fibrillatable PTFE in a range from about 0.02 to less than 1 percent by weight, based on total solids, may be dispersed in a finely divided solid material to form an intimate mixture which, when subjected to a sufficient amount of working, forms enough PTFE fibers or fibrils to hold the material in a week agglomerate distinguishable from the finely divided material.

It has also been discovered that a dust-free agglomerate of irregular shape may be formed from a normally dusty powder by mixing the dusty powder with less than 1 percent by weight, based on total solids of fibrillatable PTFE, to form an intimate mixture and then subjecting the mixture to a compressive shearing action at, or preferably above, room temperature to form a random matrix of submicroscopic and microscopic PTFE fibers. The fibers of fibrils serve to agglomerate the normally dusty particulate material into a weak, coherent, irregularly shaped mass visually distinguishable from the normally dusty material, having surprising characteristics peculiarly adapted to utilizing the material for a specific purpose, namely, its easy dust-free dispersibility.

It is an object of this invention to provide an article of manufacture, which consists essentially of particles of normally dusty material, cohesively held without particle-to-particle adhesion as a weak agglomerate in a dry or relatively dry state, in a matrix of PTFE fibers. Though less than 1 percent by weight PTFE is included in the agglomerate, the working action to which the normally dusty material is subjected renders it dustless. Surprisingly, this working action also renders the agglomerate pliable and weak; typically, it has almost no measurable tensile strength. The agglomerate is easily dispersed in other materials because it is friable; typically, it may be fragmented by the simple expedient of placing the agglomerate on a sieve and vibrating the sieve.

A particular application of the above discovery is embodied in the formation of a porous activated carbon agglomerate having high crude-oil absorptive capacity, in which is incorporated less than 1 percent fibrillatable PTFE, by working the mixture, without noticeably changing the primary size of the carbon particles, to form an agglomerate with essentially no particle-to-particle adhesion. The particles are held in a weak matrix of PTFE fibers.

DETAILED DESCRIPTION OF THE INVENTION

In all embodiments of the instant invention, only a fibrillatable form of PTFE resin may be used. As has been indicated hereinbefore, the commonly available form of PTFE resin, namely granular molding powder, is ineffective in the process of the instant invention. Similarly, other carbonaceous polymers, such as other polyhalocarbons and known polyolefins, silicones and modifications thereof, are incapable of providing a comparable, readily friable agglomerate with substantially no particle-to-particle adhesion. A fibrillatable form of PTFE is presently restricted to two commercially available types of resin. A first type is a colloidal aqueous dispersion concentrated to about 60% by weight of polymer having particles about 0.05 to about 0.5 microns in size, with average diameters of about 0.02 $\mu$. A second type, often referred to as fine powder, is obtained by coagulation of the dispersion. This second type consists of agglomerates, with average diameters of 450 $\mu$, made up of primary particles ranging in size from 0.05 to 0.5 $\mu$ in diameter. Specific surface areas of PTFE fine powders are on the order of 10–12 m$^2$/g with an average apparent powder density of 475 g/liter. These types of resin and their manufacture are more fully described in U.S. Pat. No. 2,559,752.

As we understand the influence of the fibrillatable form of PTFE in the suppression of the dusting problem, the essential factor is fibrillation of the PTFE in situ to generate a random network or matrix of microscopic and submicroscopic fibers which are distributed throughout a mass of dusty powder, entangling the primary, normally-high-dusting particles loosely in a shaped agglomerate, without particle-to-particle adhesion, so as to maintain the essential physical properties of the powder. Submicroscopic fibers or fibrils of the matrix are evident in a treated and worked normally-high-dusting powder under extreme magnification. The matrix of PTFE fibrils not only gives form to the aggolomerate of this invention, but produces in the agglomerate peculiar and unobvious physical properties uniquely attributable to incorporating only a minute quantity of PTFE resin, less than 1 percent by weight, with normally dusty material, in an intimate, dry or relatively dry mixture, and to subjecting the mixture to a working action at elevated temperature.

The present invention is not directed to the formation of small powdery agglomerates but rather larger agglomerates having a minimum size of about ⅛ inch and including agglomerates having sufficient coherency due to the fibers that they retain their shape, as well as agglomerates that tend to assume the shape of the container in which they are held. Yet these agglomerates have little if any tensile or tear strength and little or no resistance to pressure or mechanical shock.

Depending upon the properties of the normally dusty material, particularly its size range and particle shape, an amount of PTFE as low as 0.02% by weight, when worked with the material, is found to form an agglomerate in which the dusting characteristics of the material are essentially eliminated; even lower concentrations of PTFE may form a shaped dust-free agglomerate, but the expense of working a mixture containing little more than a trace of PTFE will normally lead to the conclusion that such a small quantity of PTFE in the agglomerate is impractical. Again, an agglomerate may be formed containing at least 1 percent PTFE, but such an agglomerate will typically have measurable strength and not be easily friable.

In one embodiment of this invention, referred to as the dry process, in a typical example, fine powder PTFE is preferably homogeneously dispersed in a pigment, which is then subjected to a working action which is a gentle shearing action with moderate compaction and moderate heating. It is not imperative that the fine powder PTFE be homogeneously dispersed in the pigment prior to being subjected to the working action described; however, since working a normally dusty material is critical to the formation of a matrix of PTFE fibers, it may be more difficult to form the agglomerate if all of the fine powder PTFE added is initially concentrated in a small portion of the dusty powder. A sufficiently intimate mixture of PTFE and dusty powder may be economically prepared by mixing dry powder with dry fine powder PTFE at a high rate of shear, for a short time, as for example, in a Waring blender, which has blades rotating at a speed in excess of 5000 r.p.m. The temperature at which this initial intensive mixing is effected is not critical; in most instances the temperature is the ambient storage temperature of the dusty powder and may range from below 0° in winter to above 49° C. in summer. The high-speed, high-shear work energy expended upon PTFE-treated dusty material during this short time, ranging from about 5 seconds to about 5 minutes, may not diminish the dusty character of the material. It will therefore be apparent that, though in most instances the time of intensive mixing is ordinarily less than a minute, the mixing vessel is preferably sealed to prevent the proliferation of clouds of dust.

The dry PTFE-treated dusty material obtained from the initial, intensive mixing stage, is thereafter subjected to a working action, at a temperature in the range from about 20° to about 200° C., in a relatively slow speed, low shear mixer. A desirable working or kneading action is provided by a slowspeed electrical mixer equipped with an impeller that smears the mixture on the walls of a small laboratory scale receptacle. On a larger production basis, a representative apparatus which provides a suitable working action is a slow-speed (60 r.p.m.) Sigma blade blender such as is used for the kneading of dough in a bakery, or a double cone blender, or a muller of the Simpson type adjusted for clearance so as to provide shear and mild compaction with a minimal amount of grinding so as to maintain the primary particle size range of the dusty material. The particular choice of working temperature depends upon the properties of the dusty material, the amount of PTFE used and the size of the agglomerate desired, but is less than the sintering temperature of PTFE or a temperature deleterious to the normally dusty material, whichever is lower. Working of the treated material is continued until a weak, pliable, somewhat doughy, coherent mass of loosely held particles is formed; this mass has a very low tensile strength and tear strength. Further working of the coherent mass yields a multiplicity of smaller agglomerates ranging in size from few particles to globules up to about 0.25 inch in diameter, and preferably less then 0.125 inch in diameter.

Dry mixing of PTFE and normally dusty material, and working of the mixture may be simultaneously effected, particularly conveniently, in a steam-jacketed Littleford-Leodige blender having centrally disposed, high-speed propellers or choppers rotating at a speed in excess of 3000 r.p.m. and a separately controllable, slow-speed plow. In such a blender, depending on the characteristics of a dusty material, the amount of high-speed mixing and low-speed working may be individually adjusted to yield agglomerates of desired shape and size.

In the dry process described hereinabove, dry fine powder PTFE is mixed with dry dusty material. Where PTFE in an amount less than 1 percent by weight, based on total solids, is added as the commercially available aqueous suspension referred to hereinbefore, so little moisture is present in the mixture that it is essentially dry; that is, for all practical purposes, it is dry and is worked as a dry mixture.

As mentioned hereinbefore, it is preferred that fibrillatable PTFE be homogeneously dispersed in the normally dusty powder prior to working the PTFE-treated material. Obtaining such a homogeneous dispersion in the dry state may be inconvenient, if not difficult in many instances, due to mixing and dusting problems. A convenient method of obviating the problem of working a dry or essentially dry PTFE-treated mixture of solid particulate fines is to work the mixture of fines with more liquid. A sufficient amount of liquid is generally present for the purpose of the invention in a relatively dry, non-fluid mass with a liquids-to-solids volume ratio less than 0.2, and more preferably, less than 0.1. Such a relatively dry, non-fluid mass may be obtained by intensively mixing dusty material and a small amount of PTFE, less than 1 percent by weight, based on total solids, in a liquid slurry in which the dusty material is wetted by the liquid but is essentially insoluble in it, and separating the solids by any conventional means so as to leave a minute quantity of residual liquid in the solids. A minute quantity of liquid is defined as an amount such that the solid particles in a mass confined under pressure do not move or change their relative position within the mass. Stated differently, the mass is nonfluid and appears to be relatively dry.

The amount of liquid in the slurry in which the dusty material and PTFE are initially intensively mixed is not critical, and serves merely quickly to effect dispersion of the PTFE in the mass of the dusty material. It will be recognized that, with a very small amount of liquid, less than that amount required to form a smooth fluid paste, a homogeneous mixture will be less conveniently effected than with a sufficient quantity of liquid to form an easily mixed slurry. Enough liquid is used to form a paste or slurry which when subjected to an intensive mixing action effects a homogeneous dispersion of the PTFE in the mixture. The type of mixer used, its action, the speed at which it operates are unimportant as long as it intimately disperses the PTFE throughout the paste or slurry. Suitable industrial mixers are Hobart, Banbury, and Cowles models. During mixing, some incidental and initial fibrillation of the PTFE will generally be experienced, the extent of fibrillation depending upon the physical characteristics of the slurry, the amount of PTFE used, the type of mixer used to effect dispersion, the intensity of the mixing action, the temperature at which mixing is carried out, and the length of time over which it is effected. From a practical point of view, only sufficient energy is expended in mixing the slurry as is required to effect an intimate dispersion of the PTFE in the mixture.

In a subsequent step, the liquid is separated from the solid materials in the mixture by any liquid-solid separation means, such as filtration, centrifuging and the like. The solid material obtained is an essentially homogeneous, relatively dry mass, contaminated with residual liquid. The volume ratio of liquid-to-solids is less than 0.2, and generally less than 0.1, it being understood that, from a practical standpoint, the less residual liquid left, the better.

The relatively dry mass contaminated with residual liquid is formed into agglomerates by working the mass in a low speed mixer, as described hereinbefore, so as to form a matrix of PTFE fibers which loosely hold the particles in each agglomerate. It is critical that, whatever the mixing means used, the dry mass be subjected to a compressive shearing action in a zone in which there is relative movement between the particles of normally dusty material, when the entire mass is not tightly confined. For example, an adequate working action which subjects the mass to sufficient compressive shear may be generated by manually spatulating a small quantity of dry, or relatively dry, PTFE-treated material against the walls of a relatively large beaker at a suitable temperature above 20° C. On an industrial scale, relatively dry PTFE-treated material may be pelletized on a disc pelletizer, or in a Sigma blade blender such as is used for the kneading of dough in a bakery, or in a Hobart type mixer at a preselected temperature. It has been found that, particularly when a Hobart mixer is used, the working action to which the treated material is subjected produces a large, friable, agglomerated mass which, upon further working in the mixer, suddenly produces a break of the mass into a multiplicity of small agglomerates of relatively uniform shape. In all cases, the treated mass being worked is free to move away from the immediate zone in which particles of normally dusty material are subjected to the compressive shearing action of the mixing means.

The agglomerate of this invention is peculiarly adapted to facalitate the dispersion of finely divided particulate materials into other materials because of its weakness and especial friability. For example, in numerous instances when a normally dusty organic or inorganic pigment or filler is utilized with difficulty and inconvenience in the chemical process industries, the weak agglomerate of this invention fills a specific requirement, namely a dustless agglomerate which is easily dispersed. It is especially noteworthy that the ease of dispersion of this dustless agglomerate is predicated on its weakness. Beyond stating that the agglomerate has no toughness as evidenced by low measurable tear strength, and no measurable tensile strength, its weakness is difficult to quantify; as has been stated hereinbefore, this weakness is evidenced by ease of tearing, a remarkable lack of resistance to pressure, and essentially no stability of shape when transported in bulk. Yet, it is dust-free, pliable at ambient room temperature and so friable that a mass of agglomerates may be reduced to a powder by sieving them.

Where activated carbon is to be used for the absorption of oil spilled on water, agglomerates of the activated carbon produced by the methods described hereinabove are surprisingly effective in absorbing the oil. Where water-soluble, normally dusty particles are agglomerated, solution of the treated agglomerate particles may be delayed depending upon the amount of PTFE used, the extent of working, the primary particle size range, and the like, to provide controlled release of the particulate material into the water. Where clay, diatomaceous earth and the like are to be used for the absorption of cleaning fluids, agglomerates of this invention exhibit high absorptive capacity.

EXAMPLE 1

Approximately 4 liters of finely divided pigment scarlet 25 AD No. 1060, an organic pigment manufactured by the Harshaw Chemical Company, division of Kewanee Oil Company, was placed in an 18 inch Simpson Muller and a small amount equivalent to 0.2% by weight of the pigment of a fibrillatable polytetrafluoroethylene resin was sprinkled on top of the pigment. The muller was run at about 6 – 8 R.P.M. for 30 minutes at 75° C. to fibrillate the PTFE and to distribute it uniformly throughout the pigment. The resultant product consisted of self supporting agglomerates having a consistency approaching that of putty and an average size of which was about 1 inch in diameter.

These agglomerates can be used as is or can be stored and shipped as desired. They can also be easily converted into a free flowing powder by mechanically treating them to break up the fibers of PTFE into shorter lengths. For instance, continued working at slow speeds for a prolonged period of time will result in a decrease in cohesiveness. Working at cooler temperatures at or below 20° C. will accelerate this degradation of the agglomerate as will working at higher speeds. Also, shaking or tumbling the agglomerates will quickly reduce their size, while preserving the advantages of a non-dusting material.

Although the foregoing constitutes a full and complete description of the invention and the preferred mode of carrying out the same, it is not intended as a limitation thereof.

Instead, the limits of the invention are defined by the claims wherein we claim:

1. A weak, but coherent dust-free agglomerate having a minimum size of about ⅛ inch comprising loose particles of a normally dusty material and fibers of fibrillated polytetrafluoroethylene resin distributed throughout said loose particles effective to provide coherence to the agglomerate, the fibers of the resin comprising less than 1 percent by weight of the agglomerate, the physical properties of the particles in the agglomerate remaining unchanged, said agglomerate characterized by an absence of particle to particle adhesion.

2. The agglomerate of claim 1 wherein the fibers of polytetrafluoroethylene resin comprise between about 0.02 percent and 0.75 percent by weight of the agglomerate.

3. The agglomerate of claim 1 wherein the particles of material are smaller than about 2,000 microns in size.

4. A weak but coherent dust-free agglomerate at least about ⅛ inch in size formed by mixing fibrillatable polytetrafluoroethylene resin in an amount up to 1% by weight, with a normally dusty particulate material to yield an intimate mixture and working said mixture at a temperature of at least 20° C. but below the sintering temperature of said resin or the degradation temperature of said material, whichever is lower, to form a sufficient number of fibers from said resin to provide coherence to the agglomerate said agglomerate characterized by an absence of particle to particle adhesion and wherein the physical properties of said particulate material remain unchanged.

* * * * *